United States Patent
Hochstetler et al.

(10) Patent No.: US 10,539,213 B2
(45) Date of Patent: Jan. 21, 2020

(54) HYDRAULIC UNIT CYLINDER BLOCK FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 218 days.

(21) Appl. No.: 15/723,481

(22) Filed: Oct. 3, 2017

(65) Prior Publication Data
US 2019/0101202 A1 Apr. 4, 2019

(51) Int. Cl.
*F16H 47/04* (2006.01)
*F01B 3/00* (2006.01)
(Continued)

(52) U.S. Cl.
CPC ........... *F16H 47/04* (2013.01); *F01B 3/0085* (2013.01); *F16H 37/0826* (2013.01);
(Continued)

(58) Field of Classification Search
CPC ...... F04B 1/2021; F04B 1/2035; F04B 53/16; F04B 53/14; F01B 3/0085; F03C 1/0647; F03C 1/0652; F03C 1/2021; F03C 1/2035
See application file for complete search history.

(56) References Cited

U.S. PATENT DOCUMENTS 3,585,901 A * 6/1971 Moon, Jr. ............. F04B 1/2021
   91/6.5
4,794,756 A * 1/1989 Iseman ................... F16H 48/18
   60/487

(Continued)

FOREIGN PATENT DOCUMENTS

EP   1162369 A2   12/2001
EP   1251275 A2   10/2002

OTHER PUBLICATIONS

Danfoss ("Service Manual and Repair Instructions: Axial Piston Pumps" Jun. 2014, retrieved from https://assets.danfoss.com/documents/DOC152886482402/DOC152886482402.pdf on Jun. 25, 2019) (Year: 2014).*

(Continued)

*Primary Examiner* — Nathaniel E Wiehe
*Assistant Examiner* — Richard C Drake
(74) *Attorney, Agent, or Firm* — Carlson, Gaskey & Olds, P.C.

(57) ABSTRACT

A cylinder block for use in an integrated drive generator has a shaft portion with a relatively small outer diameter and a cylindrical body portion having a larger outer diameter than the shaft portion, and said cylindrical body portion formed with a plurality of piston chambers, said cylindrical body portion extending from a first end to a second end, said second end being provided with cylindrical ports leading into said piston chambers and said cylindrical ports having a third end and a fourth end wherein a ratio of a first distance from said first end to said fourth end to a second distance from said first end to said second end being between 0.91 and 0.93. A generator and a method are also described.

10 Claims, 3 Drawing Sheets

(51) Int. Cl.
*F16H 37/08* (2006.01)
*F16H 39/14* (2006.01)
*F16H 48/42* (2012.01)
*H02K 7/18* (2006.01)
*F16H 57/08* (2006.01)

(52) U.S. Cl.
CPC ............. *F16H 39/14* (2013.01); *F16H 48/42* (2013.01); *H02K 7/1838* (2013.01); *F04B 1/124* (2013.01); *F05D 2260/40311* (2013.01); *F16H 57/082* (2013.01)

(56) References Cited

U.S. PATENT DOCUMENTS

| | | | | |
|---|---|---|---|---|
| 6,016,739 | A | 1/2000 | Baehler | |
| 6,237,465 | B1* | 5/2001 | Forster | F04B 1/2078 92/129 |
| 6,250,206 | B1* | 6/2001 | Johnson | F01B 3/0085 92/158 |
| 6,802,244 | B1* | 10/2004 | Stoppek | F01B 3/002 29/888.02 |
| 6,981,321 | B1* | 1/2006 | Stoppek | F04B 1/2035 29/888.02 |
| 9,154,011 | B2 | 10/2015 | Vanderzyden et al. | |
| 2006/0008362 | A1* | 1/2006 | Hugelman | F04B 1/128 417/269 |
| 2013/0288840 | A1 | 10/2013 | Grosskopf et al. | |
| 2015/0300333 | A1* | 10/2015 | Numaguchi | F04B 1/22 92/13 |
| 2016/0273531 | A1* | 9/2016 | Campbell | F03C 1/0652 |

OTHER PUBLICATIONS

ASTM B505/B505M-18 ("Standard Specification for Copper Alloy Continuous Casings", 2018, 2014 (data not changed in Tables from 2014 per Summary of Changes on p. 9) (Year: 2014).*

European Search Report for EP Application No. 18198418.8 dated Feb. 15, 2019.

* cited by examiner

HYDRAULIC UNIT CYLINDER BLOCK FOR INTEGRATED DRIVE GENERATOR

BACKGROUND OF THE INVENTION

This application relates to a cylinder block for use in a hydraulic unit of an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

The cylinder blocks for use in the trimming unit face design challenges.

SUMMARY OF THE INVENTION

A cylinder block for use in an integrated drive generator has a shaft portion with a relatively small outer diameter and a cylindrical body portion having a larger outer diameter than the shaft portion, and said cylindrical body portion formed with a plurality of piston chambers, said cylindrical body portion extending from a first end to a second end, said second end being provided with cylindrical ports leading into said piston chambers and said cylindrical ports having a third end and a fourth end wherein a ratio of a first distance from said first end to said fourth end to a second distance from said first end to said second end being between 0.91 and 0.93. In addition, an integrated drive generator and a method of replacing a cylinder block from an integrated drive generator are disclosed.

These and other features may be best understood from the following drawings and specification.

DETAILED DESCRIPTION

Figure 1:
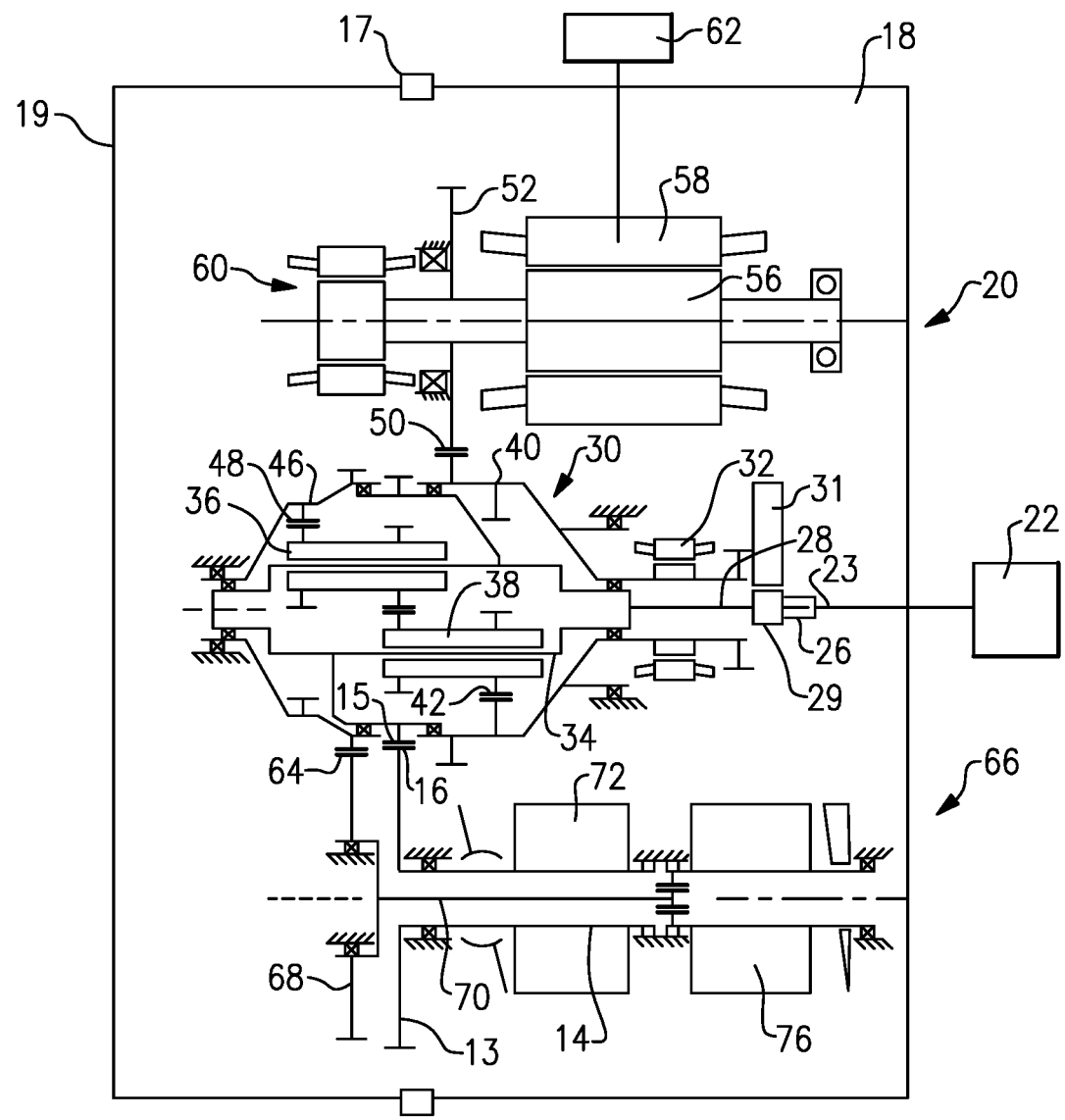
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the carrier shaft 28 and drives a plurality of accessory gears 31.

The operation of the integrated drive generator 20 is generally as known in the art. A worker of ordinary skill would recognize that the desired frequency and speed at use 62 would dictate a number of design functions.

Figure 2:
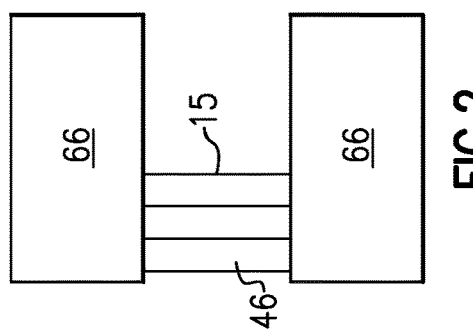
FIG. 2 schematically shows hydraulic units in the integrated drive generator.

FIG. 2 shows that there are a pair of hydraulic or speed trimming units 66 associated with a single ring gear 46 and a single carrier 15.

Figure 3:
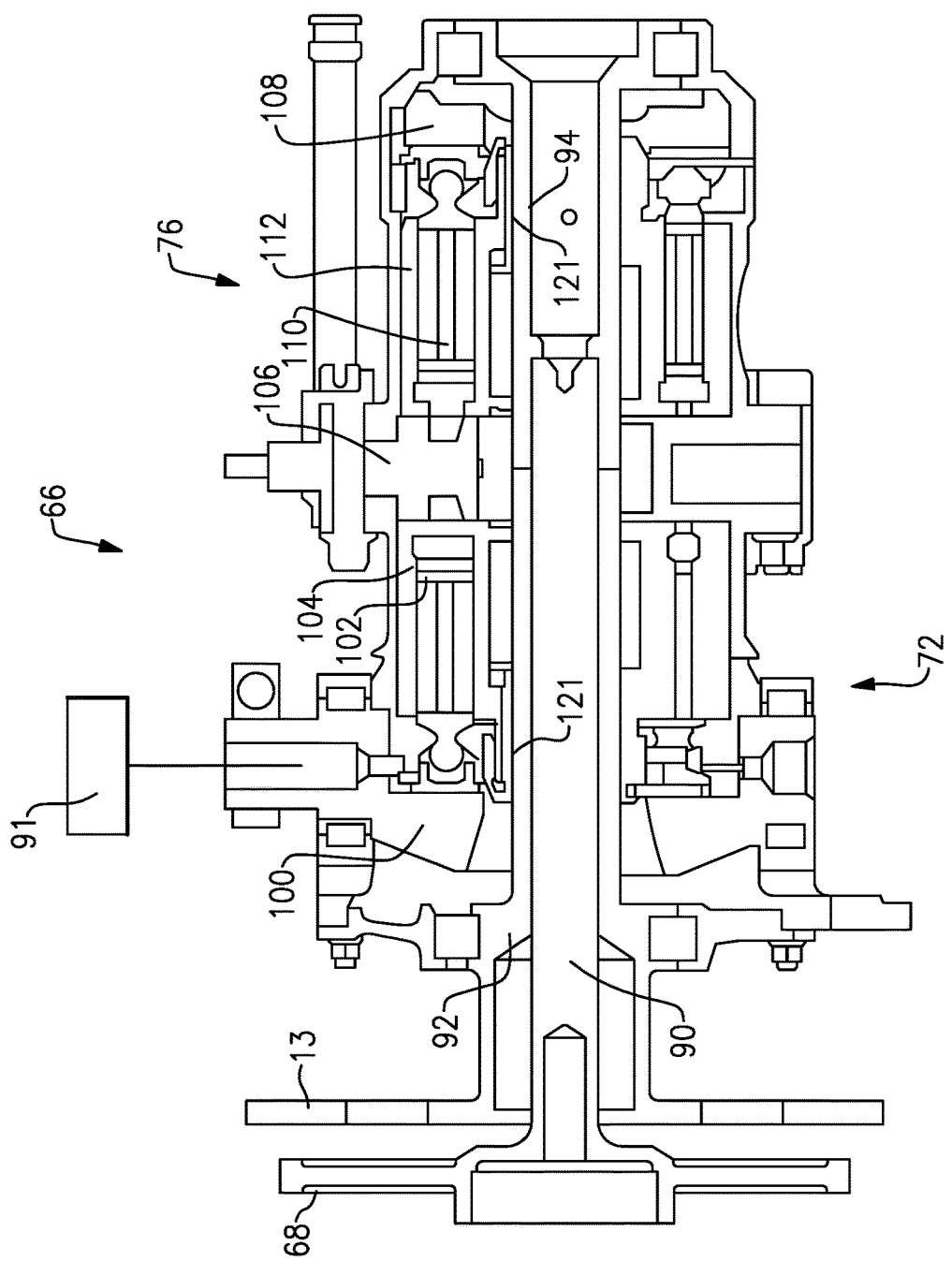
FIG. 3 shows the components of a hydraulic unit.

FIG. 3 shows details of the hydraulic unit 66. A speed into the gear 13 will be proportional to the speed from the input shaft 23. The gear 13 rotates with a shaft 92. The shaft, through splined teeth 121, drives a cylinder block 104 to rotate.

A control 91 changes the position of a swash plate 100 based upon the input speed seen at the generator. As the cylinder block 104 rotates, pistons 102 within the cylinder block cam off a surface of the swash plate 100. As the position of the swash plate 100 is changed by control 91, the amount of hydraulic fluid driven by the pistons 102, through a port plate 106, and against piston 110 in a cylinder block 112 changes. As the pistons 110 move, they cam off a surface of fixed swash plate 108. This results in a control of a speed and direction of rotation of cylinder block 112. Cylinder block 112 has a spline connection at 121 to a shaft 94. Thus, the hydraulic unit 66 results in a desired speed and direction of rotation of the shaft 94, ultimately based upon the input speed seen at the generator. The shaft 94 drives the shaft 90 to in turn drive the gear 68. The gear 68 interacts with the trim ring gear 46 such that the ultimate speed leaving the differential 30 to the gear 52 is controlled to achieve a constant desired speed at the generator.

The cylinder blocks 104 and 112 are effectively identical. In addition, there are similar cylinder blocks 104/112 in both of the hydraulic units 66.

Figure 4:
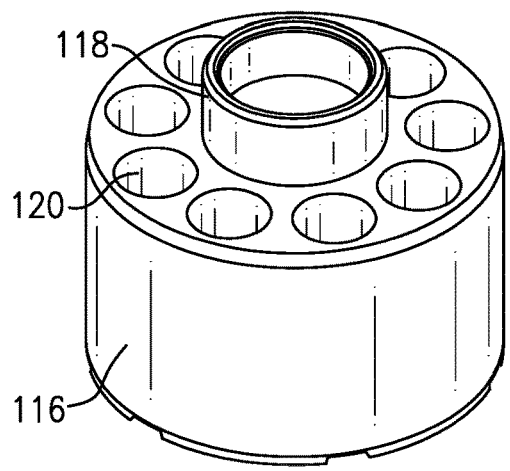
FIG. 4 is a view of a cylinder block.

FIG. 4 shows a block 104, but, again, block 112 is identical. A shaft stub 118 is supported on the shafts 92 or 94 (see FIG. 3). Piston chambers 120 extend to a rear surface and a cylindrical main body 116 extends to a forward surface.

Figure 5:
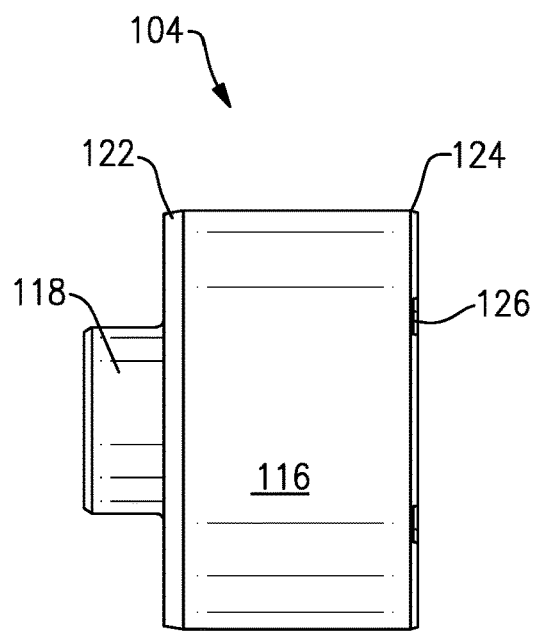
FIG. 5 is the side view of the cylinder block.

As shown in FIG. 5, a wear plate 126 is bonded to a front end 124 of the main body 116. A rear end 122 of the main body 116 is also defined.

Figure 6:
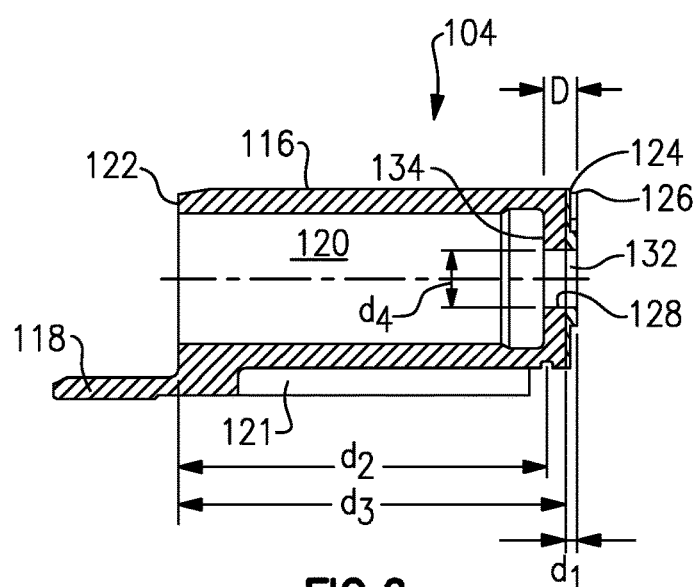
FIG. 6 is a cross-sectional view through a portion of the cylinder block.

As shown in FIG. 6, there are ports 128 adjacent the front end 124. Similar port holes 132 extend through the bronze wear plate 126. The bronze wear plate is bonded to the main body 116. In one embodiment, the bronze wear plate 126 is formed of a lead-free bronze. In particular, the bronze wear plate may be formed of ASTM B505, alloy C90700.

The wear plate 126 has a thickness $d_1$ as shown in FIG. 6. A thickness $d_2$ is defined to an inner end 134 of the port 128. Stated another way, $d_2$ is measured between ends 122 and 134. A distance $d_3$ is defined between the rear end 122 of the cylindrical body portion 116 and the front end 124. In embodiments, $d_1$ is 0.047 inch (0.119 cm), $d_2$ is 1.631 inches (4.142 CM), and $d_3$ is 1.773 inches (4.503 cm).

A depth D of the port 128 is thus 0.142 inch (0.36 cm). In the prior art, the depth of the port was 0.162 inch (0.41 cm). In embodiments, a ratio of $d_2$ to $d_3$ is between 0.91 and 0.93.

In addition, a width $d_4$ of a kidney-shaped port 128 is 0.259 inch (0.65 cm). A ratio of the depth D of the port 128 to the diameter $d_4$ is between 0.48 and 0.62. A spline 121 on an inner surface drivingly connects to shaft 92 or 94.

Figure 7:
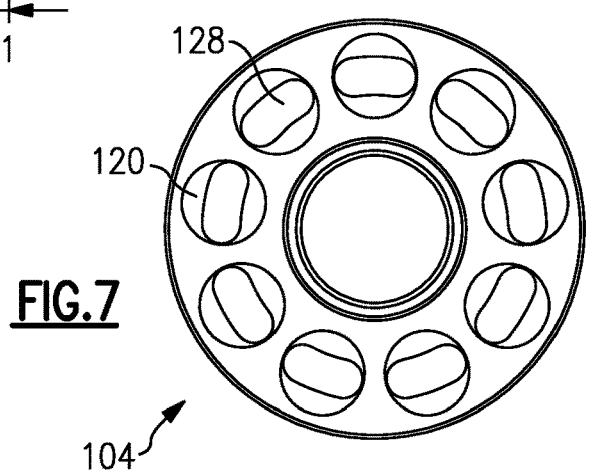
FIG. 7 is an end view of the cylinder block.

The curved arc portion 128 sits between the piston chamber 120 and the ports 132. As can be appreciated from FIG. 7, the kidney-shaped port 128 is somewhat of an oval shape. As is clear from FIG. 6, $d_4$ is the smaller dimension.

A method of replacing a cylinder block in an integrated drive generator includes the steps of removing an existing cylinder block from an integrated drive generator including an input shaft connected for driving a differential. The differential is connected for providing an input drive to a generator for generating electricity. The differential also being connected with hydraulic unit, the hydraulic unit including a variable swash plate and a fixed swash plate, and each swash plate being associated with a set of pistons, the existing cylinder block being one of a pair of cylinder blocks with one of the cylinder blocks being associated with each of the sets of pistons. The existing cylinder block is replaced with a replacement cylinder block, which has a shaft portion with a relatively small outer diameter and a cylindrical body portion having a larger outer diameter. The cylindrical body portion is formed with a plurality of piston chambers. The cylindrical body portion extends from a rear end to a forward end. The forward end is provided with ports leading into the piston chambers and the ports having a forward end and an inner end wherein a ratio of a first distance from the rear end of the cylindrical portion to the inner end of the cylindrical ports to a second distance from the rear end of the cylindrical end portion to the forward end of the cylindrical ports being between 0.91 and 0.93.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A cylinder block for use in an integrated drive generator comprising:
   a shaft portion having a relatively small outer diameter;
   a cylindrical body portion having a larger outer diameter than the shaft portion, and said cylindrical body portion formed with a plurality of piston chambers, said cylindrical body portion extending from a first end to a second end, said second end being provided with ports leading into said piston chambers and said ports having a third end and a fourth end wherein a ratio of a first distance from said first end to said fourth end to a second distance from said first end to said second end being between 0.91 and 0.93;
   wherein said ports being kidney-shaped;
   wherein said kidney-shaped ports having a width and a ratio of a depth of said kidney-shaped port, to said width is between 0.48 and 0.62;
   wherein a wear plate is affixed to said second end of said cylindrical body portion; and
   wherein said wear plate having ports aligned with said ports in said cylindrical body.

2. The cylinder block as set forth in claim 1, wherein said wear plate is formed of a lead-free bronze.

3. The cylinder block as set forth in claim 2, wherein said lead-free bronze is ASTM B505, alloy C90700.

4. An integrated drive generator comprising:
   an input shaft for driving a differential;
   said differential for providing an input drive to a generator for generating electricity, and said differential also being connected with a hydraulic unit, said hydraulic unit including a variable swash plate and a fixed swash plate, and each of said swash plates being associated with a set of pistons, a pair of cylinder blocks with one of said cylinder blocks being associated with each of said sets of pistons;
   said cylinder blocks having a shaft portion with a relatively small outer diameter and a cylindrical body portion having a larger outer diameter than the shaft portion, and said cylindrical body portion formed with a plurality of piston chambers, said cylindrical body portion extending from a first end to a second end, said second end being provided ports leading into said piston chambers and said ports having a third end and a fourth end wherein a ratio of a first distance from said first end to said fourth end to a second distance from said first end to said second end being between 0.91 and 0.93;
   wherein said ports being kidney-shaped;
   wherein said kidney-shaped ports having a width and a ratio of a depth of said kidney-shaped port, to said width is between 0.48 and 0.62;
   wherein a wear plate is affixed to said second end of said cylindrical body portion; and
   wherein said wear plate having ports aligned with said ports in said cylindrical body.

5. The integrated drive generator as set forth in claim 1, wherein said wear plate is formed of a lead-free bronze.

6. The integrated drive generator as set forth in claim 5, wherein said lead-free bronze is ASTM B505, alloy C90700.

7. The integrated drive generator set forth in claim 4, wherein there are a pair of said hydraulic units.

8. A method of replacing a cylinder block in an integrated drive generator comprising the steps of:

removing an existing cylinder block from an integrated drive generator including an input shaft connected for driving a differential, said differential for providing an input drive to a generator for generating electricity, and said differential also being connected with hydraulic unit, said hydraulic unit including a variable swash plate and a fixed swash plate, and each of said swash plates being associated with a set of pistons, said existing cylinder block being one of a pair of cylinder blocks with one of said cylinder blocks being associated with each of said sets of pistons;

replacing said existing cylinder block with a replacement cylinder block, said replacement cylinder block having a shaft portion with a relatively small outer diameter and a cylindrical body portion having a larger outer diameter than the shaft portion, and said cylindrical body portion formed with a plurality of piston chambers, said cylindrical body portion extending from a first end to a second end, said second end being provided with ports leading into said piston chambers and said ports having a third end and a fourth end wherein a ratio of a first distance from said first end to said fourth end to a second distance from said first end to said second end being between 0.91 and 0.93;

wherein said ports being kidney-shaped;

wherein said kidney-shaped ports having a width and a ratio of a depth of said kidney-shaped port, to said width is between 0.48 and 0.62;

wherein a wear plate is affixed to said second end of said cylindrical body portion; and wherein said wear plate having ports aligned with said ports in said cylindrical body.

9. The method of replacing a cylinder plate as set forth in claim 8, wherein said wear plate is formed of a lead-free bronze.

10. The method of replacing a cylinder plate set forth in claim 8, wherein there are a pair of said hydraulic units.

* * * * *